(12) United States Patent
Blendea et al.

(10) Patent No.: US 9,102,246 B2
(45) Date of Patent: Aug. 11, 2015

(54) CABLE SYNCHRONIZER SYSTEM

(71) Applicant: Leggett & Platt Canada Co., Halifax (CA)

(72) Inventors: Horia Blendea, LaSalle (CA); Robert J. McMillen, Tecumseh (CA); Paul Tindall, Harrow (CA)

(73) Assignee: LEGGETT & PLATT CANADA CO., Halifax, Nova Scotia (CA)

( * ) Notice: Subject to any disclaimer, the term of this patent is extended or adjusted under 35 U.S.C. 154(b) by 208 days.

(21) Appl. No.: 13/735,724

(22) Filed: Jan. 7, 2013

(65) Prior Publication Data

US 2014/0191553 A1 Jul. 10, 2014

(51) Int. Cl.
| | | |
|---|---|---|
| *B60N 2/00* | (2006.01) |
| *B60N 2/20* | (2006.01) |
| *F16C 1/10* | (2006.01) |
| *B60N 2/02* | (2006.01) |
| *B60N 2/235* | (2006.01) |
| *B60N 2/44* | (2006.01) |
| *F16C 1/12* | (2006.01) |

(52) U.S. Cl.
CPC .............. *B60N 2/20* (2013.01); *B60N 2/0232* (2013.01); *B60N 2/2356* (2013.01); *B60N 2/443* (2013.01); *F16C 1/10* (2013.01); *F16C 1/106* (2013.01); *F16C 1/12* (2013.01); *B60N 2002/0236* (2013.01); *F16C 2326/08* (2013.01); *Y10T 74/20402* (2015.01)

(58) Field of Classification Search
CPC .................................. B60N 2/20; A47C 1/032
USPC .............. 297/378.12, 378.1, 354.1, 149, 151, 297/153
See application file for complete search history.

(56) References Cited

U.S. PATENT DOCUMENTS

| | | | | |
|---|---|---|---|---|
| 4,938,603 A | * | 7/1990 | Turner et al. .................. 297/16.1 |
| 5,246,272 A | * | 9/1993 | Kato et al. ..................... 297/364 |
| 5,489,138 A | * | 2/1996 | Mariol et al. .................. 297/151 |
| 5,823,615 A | * | 10/1998 | Haut ............................. 297/151 |
| 6,557,941 B1 | * | 5/2003 | Heckel et al. ............. 297/354.12 |
| 6,644,730 B2 | * | 11/2003 | Sugiura et al. .................. 297/15 |

(Continued)

FOREIGN PATENT DOCUMENTS

| | | |
|---|---|---|
| DE | 10310424 | 9/2004 |
| GB | 1067134 | 5/1967 |

OTHER PUBLICATIONS

International Search Report and Written Opinion of the International Searching Authority, International Patent Application No. PCT/CA2013/000995, dated Feb. 13, 2014.

*Primary Examiner* — David E Allred
*Assistant Examiner* — Alexander Harrison
(74) *Attorney, Agent, or Firm* — Michael Best & Friedrich LLP

(57) ABSTRACT

An actuation system for concurrently actuating a first mechanism and a second mechanism from a first state to a second state includes an actuator and a sliding member operatively engaged with the actuator and movable from a first position to a second position in response to actuation of the actuator. A connecting member has a relaxed state and a taut state. The connecting member includes a first end coupled to the first mechanism, a second end coupled to the second mechanism, and a medial portion cooperative with the sliding member. Movement of the sliding member from the first position to the second position changes the connecting member from the relaxed state to the taut state, whereby the tension is increased in the connecting member.

13 Claims, 7 Drawing Sheets

(56) References Cited

U.S. PATENT DOCUMENTS

| | | | |
|---|---|---|---|
| 7,066,542 B2 * | 6/2006 | Wang | 297/376 |
| 7,152,923 B2 * | 12/2006 | Charras et al. | 297/378.12 |
| 7,270,361 B2 * | 9/2007 | Oishi et al. | 296/65.03 |
| 7,575,281 B2 * | 8/2009 | Jeong | 297/367 R |
| 7,806,480 B2 * | 10/2010 | Wieclawski | 297/378.12 |
| 8,038,217 B2 * | 10/2011 | Yamagishi et al. | 297/341 |
| 8,061,777 B2 * | 11/2011 | Jensen | 297/391 |
| 8,360,527 B2 * | 1/2013 | Lehmann | 297/367 R |
| 8,602,495 B2 * | 12/2013 | Jeong et al. | 297/334 |
| 8,616,647 B2 * | 12/2013 | Chen | 297/364 |
| 8,807,652 B2 * | 8/2014 | Jeong et al. | 297/378.12 |
| 2004/0066079 A1 * | 4/2004 | Schwerdtner et al. | 297/378.12 |
| 2004/0124684 A1 * | 7/2004 | Bonk | 297/378.12 |
| 2004/0140705 A1 * | 7/2004 | McMillen et al. | 297/378.1 |
| 2005/0029852 A1 * | 2/2005 | Chen | 297/354.12 |
| 2005/0104433 A1 * | 5/2005 | Ganot et al. | 297/378.12 |
| 2006/0138844 A1 * | 6/2006 | LaVoie et al. | 297/378.12 |
| 2008/0036258 A1 * | 2/2008 | Holdampf et al. | 297/284.9 |
| 2011/0049953 A1 | 3/2011 | Champ | |
| 2012/0169101 A1 * | 7/2012 | Suzuki et al. | 297/354.1 |
| 2013/0057043 A1 * | 3/2013 | Ngiau et al. | 297/378.1 |
| 2014/0217793 A1 * | 8/2014 | Nguyen et al. | 297/313 |

* cited by examiner

CABLE SYNCHRONIZER SYSTEM

BACKGROUND

The present invention relates to a system for synchronous activation of multiple components, for example, the synchronous activation of opposing vehicle seat latches to permit foldable operation of the vehicle seat.

Foldable seat systems generally include a recliner mechanism having opposing latches on each side of a seat base that together hold the seat in an upright position. The folding action of the seat may be manually initiated or powered through depression of a push-button in order to release these latches. Often, separate cables extend from an actuator mechanism to a lever or similar device coupled to each latch. Because these separate cables may have distinct tolerances or degrees of flexibility, activation of a seat folding operation does not necessarily lead to simultaneous release of the latches. Such a situation can lead to a delay between the release of the first latch and the release of the second latch, which can cause increased stresses in and potential damage to one or both of the latches and surrounding components.

SUMMARY

In one embodiment of an actuation system for a folding seat, the seat includes a seat frame having a first back support member, a second back support member, a first bottom support member, and a second bottom support member. A first seat latch pivotally couples the first back support member to the first bottom support member about a pivot axis and has a locked position and an unlocked position. A second seat latch pivotally couples the second back support member to the second bottom support member about the pivot axis and has a locked position and an unlocked position. The actuation system includes an actuator configured for coupling to the seat frame and a sliding member coupled to the actuator and movable from a first position to a second position in response to actuation of the actuator. A connecting member has a first end configured for coupling to the first seat latch, a second end configured for coupling to the second seat latch, and a medial portion cooperative with the sliding member. Movement of the sliding member from the first position to the second position concurrently moves the first seat latch to the unlocked position and the second seat latch to the unlocked position.

In one embodiment of an actuation system for concurrently actuating a first mechanism and a second mechanism from a first state to a second state, the actuation system includes an actuator and a sliding member operatively engaged with the actuator and movable from a first position to a second position in response to actuation of the actuator. A connecting member has a relaxed state and a taut state. The connecting member includes a first end coupled to the first mechanism, a second end coupled to the second mechanism, and a medial portion cooperative with the sliding member. Movement of the sliding member from the first position to the second position changes the connecting member from the relaxed state to the taut state, whereby the tension is increased in the connecting member.

In one embodiment of an actuation system for use with a folding seat, the seat includes a seat frame having a first back support member, a second back support member, a first bottom support member, and a second bottom support member. A first seat latch pivotally couples the first back support member to the first bottom support member about a pivot axis and has a locked and unlocked position. A second seat latch pivotally couples the second back support member to the second bottom support member about the pivot axis and has a locked and unlocked position. The actuation system includes a motor configured for coupling to the seat frame and a flexible cable having a first end configured for coupling to the first seat latch, a second end configured for coupling to the second seat latch, and a medial portion. A sliding member is coupled to the motor and configured to interact with the medial portion. The sliding member is movable from a first position to a second position in response to actuation of the motor. In the second position the flexible cable has a taut uniform tension insufficient to unlock the first latch and the second latch. The sliding member is further movable from the second position to a third position. Movement to the third position concurrently moves the first seat latch to the unlocked position and the second seat latch to the unlocked position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used herein and in the appended claims, the terms "upper", "lower", "top", "bottom", "front", "back", and other directional terms are not intended to require any particular orientation, but are instead used for purposes of description only.

Figure 1:
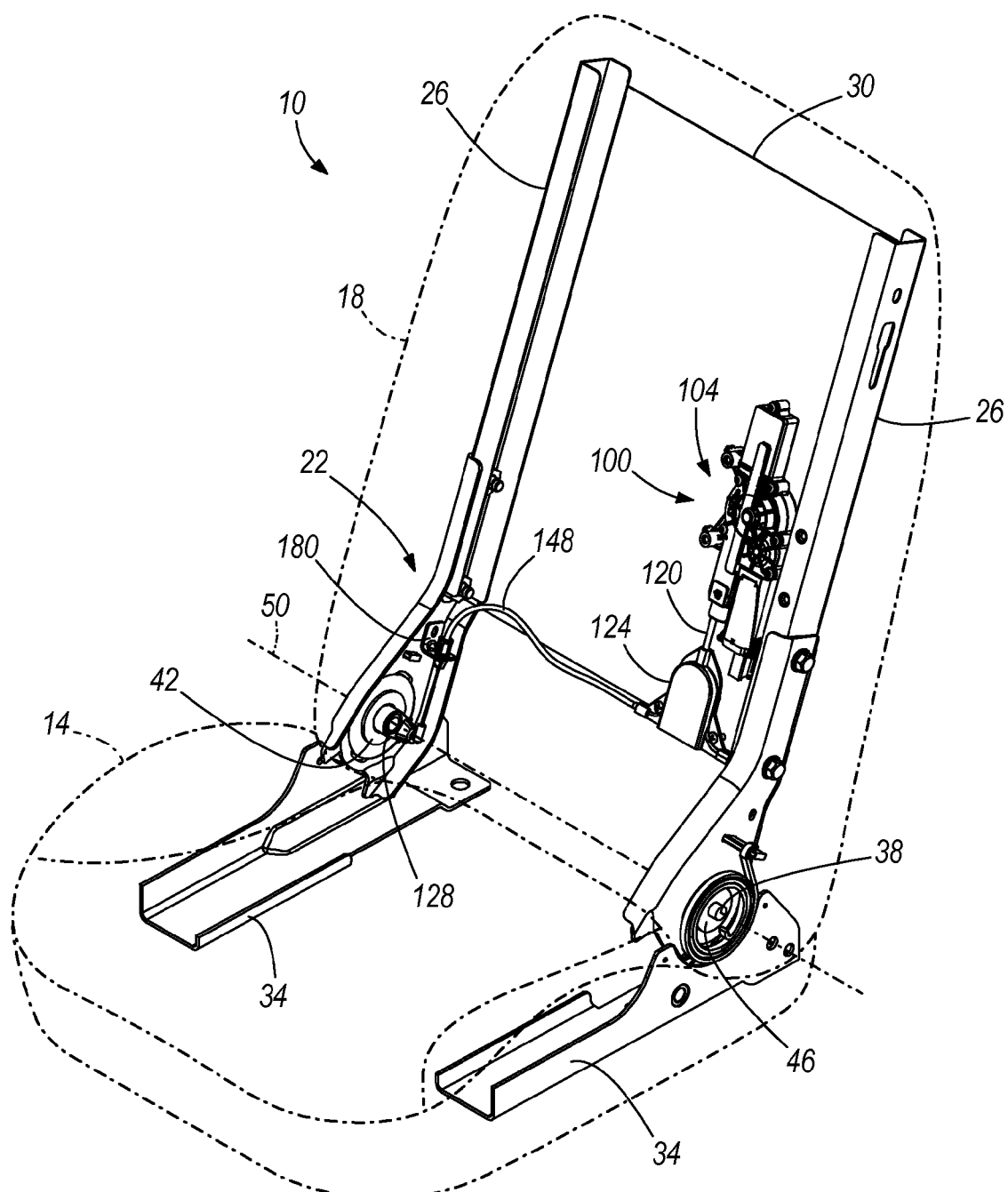
FIG. 1 is a perspective view of a vehicle seat including a synchronizer system.

FIG. 1 illustrates a seat 10, which for purposes of the following description may be any seat within the passenger compartment of a vehicle, though the seat 10 is not necessarily limited to vehicular applications. The seat 10 generally includes a seat bottom 14 and a seat backrest 18 for horizontal and vertical support, respectively, of a seat occupant. A frame 22, which is covered by overlying cushions (shown in phantom), provides structural integrity for the seat 10 and includes a pair of back support members 26, a back plate 30, and a pair of bottom support members 34. The seat backrest 18 is foldable relative to the seat frame 22 at a pivot 38 defined by the location of first and second seat latches 42, 46. The seat 10 can be placed in an upright position in which the seat backrest 18 and bottom 14 are substantially orthogonal, and in a folded position in which the seat backrest 18 and bottom 14 are substantially parallel. Optionally, the seat 10 may be placed between the upright and folded positions. Once positioned, the seat latches 42, 46 may thereafter be locked in place. A synchronizer system 100 is coupled to the seat latches 42, 46 to simultaneously place both of the latches in the unlocked state.

Figure 2:
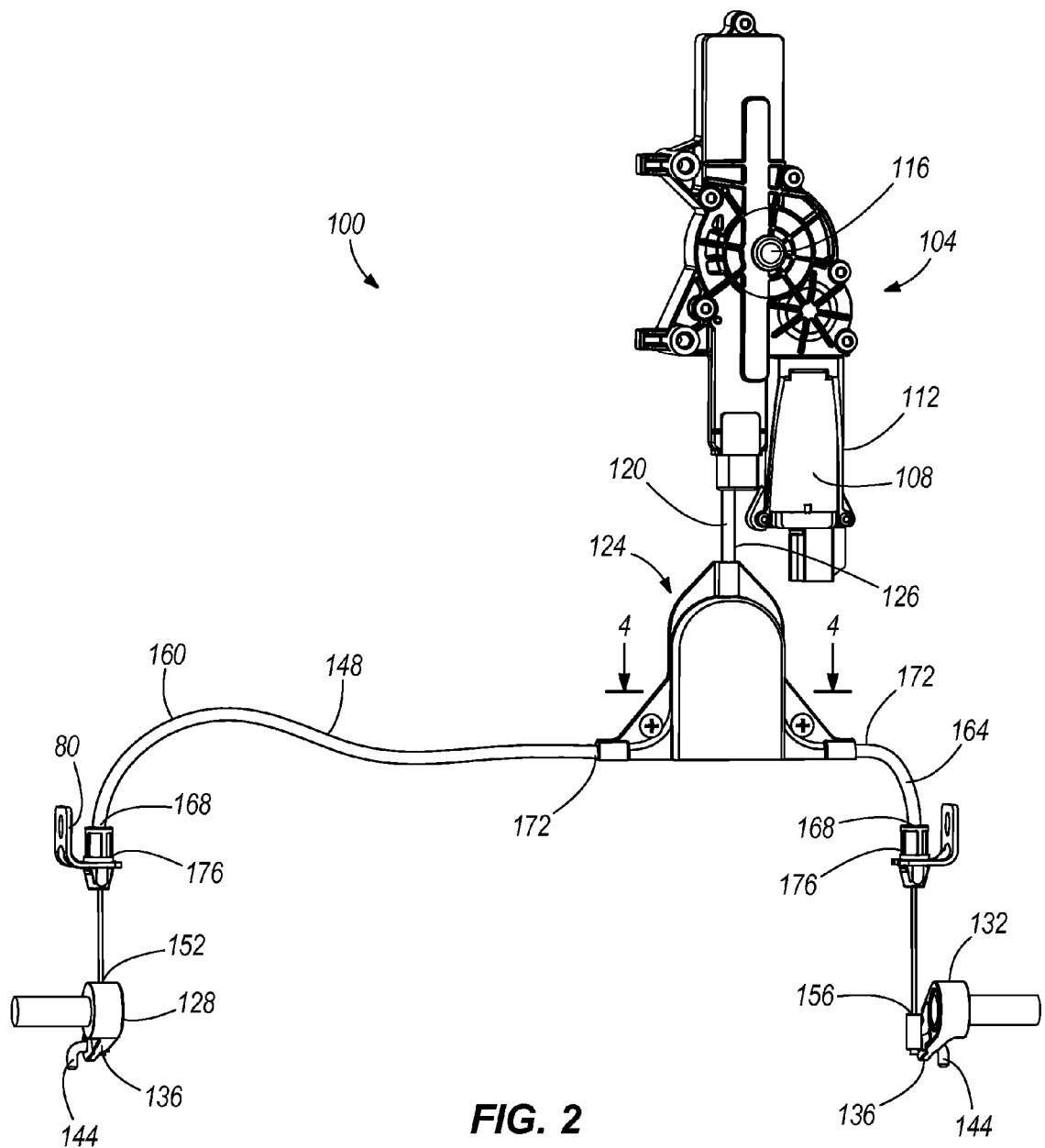
FIG. 2 is a perspective view of the synchronizer system of FIG. 1.

Referring to FIGS. 1 and 2, a drive assembly, or actuator 104, includes a motor 108 enclosed in a motor housing 112 and a gearing arrangement (not shown) enclosed in a gear housing 116, both of which are secured to the back plate 30. The motor 108 is preferably a DC motor but can be of any type suitable for the application and can vary in size and power as necessary. An actuation member, or cable 120, extends from the gear housing 116 such that when the motor 108 is activated, the motor, through the gearing arrangement, is able to retract and release the actuation cable 120. The gearing arrangement can be, for example, a rack and pinion system, a spool, or other like system. The actuation cable 120 extends from the gear housing 116 to a sliding mechanism 124, the details of which will be further described below. In an alternative embodiment, the actuation cable 120 can be manually actuated, i.e., the actuator 104 is manually operable without the use of a motor. As shown, the cable 120 can optionally include a sheath 126.

With continued reference to FIGS. 1 and 2, the first and second seat latches 42, 46 each rotatably couple one of the back support members 26 to an adjacent bottom support member 34. The first and second seat latches 42, 46 are pivotally aligned to define a pivot axis 50 and permit the seat backrest 18 to fold relative to the seat bottom 14. The seat latches 42, 46 are either locked in place or unlocked and free to rotate. In some seat applications, the seat backrest 18 and seat bottom 14 can be disposed between the upright position and folded position and locked in place. The latches 42, 46 are independently operable via a respective first lever 128 and a second lever 132. Specifically, each lever 128, 132 can be actuated to place the seat latch 42, 46 in an unlocked position by rotating the lever 128, 132 a predetermined angular distance about the pivot axis 50.

Figure 3:
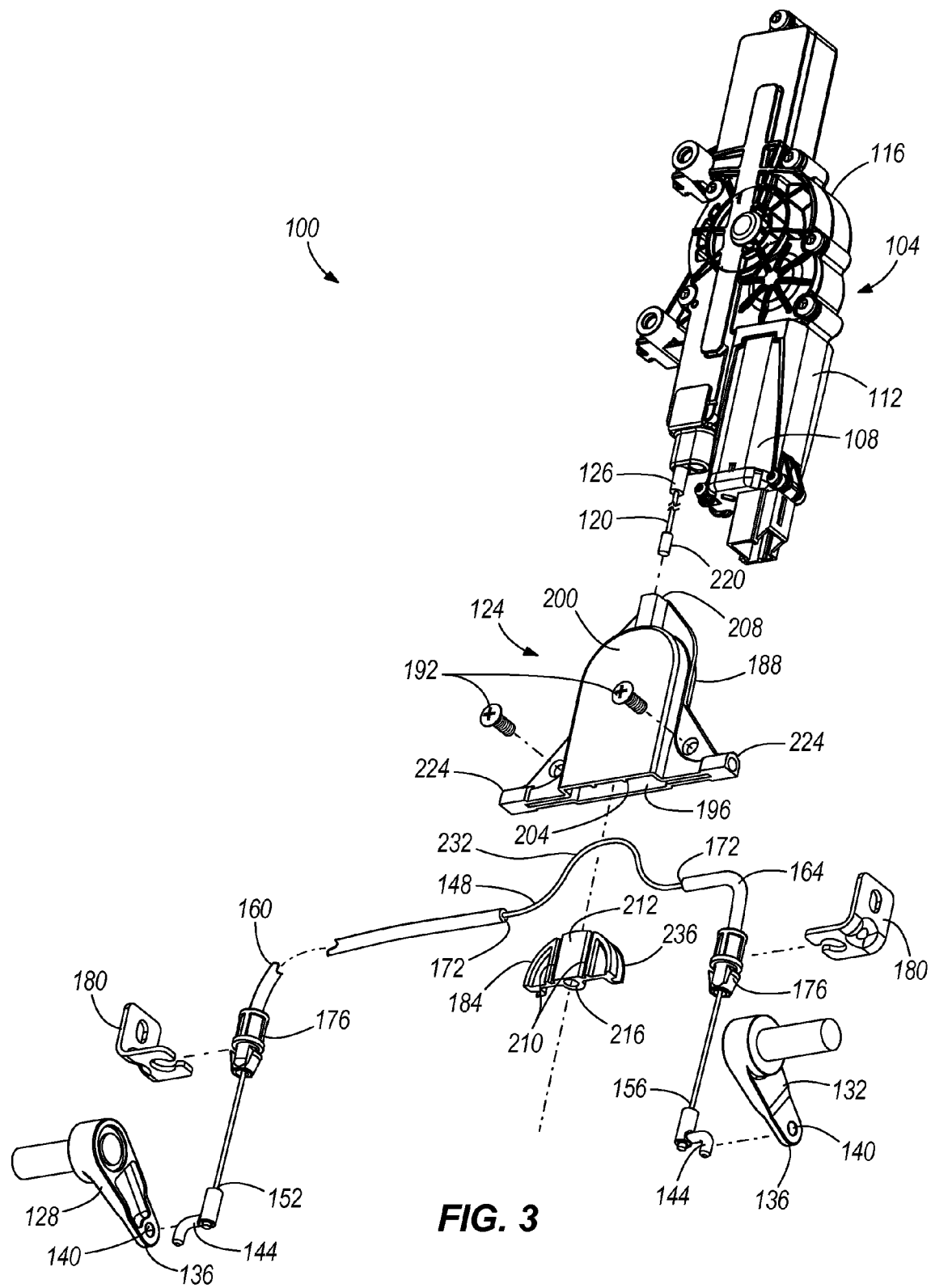
FIG. 3 is an exploded view of the synchronizer system of FIG. 1.

As shown in FIGS. 2 and 3, the first lever 128 and the second lever 132 each include a lever end 136 with an aperture 140 through which a cable connection 144 is disposed. A connecting member, such as a flexible cable or a Bowden cable 148, includes a first end 152 removably fixed to one of the cable connections 144 and a second end 156 removably fixed to the other cable connection 144. The cable 148 extends from the first lever 128 to the second lever 132 and includes first and second sheath sections 160, 164, each with a first end 168 and a second end 172. The first ends 168 of each sheath section 160, 164 are each secured to a connector 176 affixed to a bracket 180 fastened to a respective back support member 26. The first end 152 of the cable 148 extends from the first end 168 of the first sheath 160 and is coupled to the first lever 128, while the second end 156 of the cable 148 extends from the first end 168 of the second sheath 164 and is coupled to the second lever 132, as previously described.

With further reference to FIG. 3, the sliding mechanism 124 includes a sliding member 184 and a sliding member housing 188. The sliding member housing 188 is secured to the back plate 30 with fasteners 192 and defines an interior region 196 contoured to receive the sliding member 184 during operation. The sliding member housing 188 presents a first face 200 directed frontward, the opposite side of which includes a pair of inwardly projecting parallel rails 204. Though illustrated with two rails, the sliding member housing 188 could include one rail or three or more rails. The sliding member housing 188 further includes an opening 208 through which the actuation cable 120, which extends from the gear housing 116, enters for attachment to the sliding member 184, as will be further described.

Figure 4:
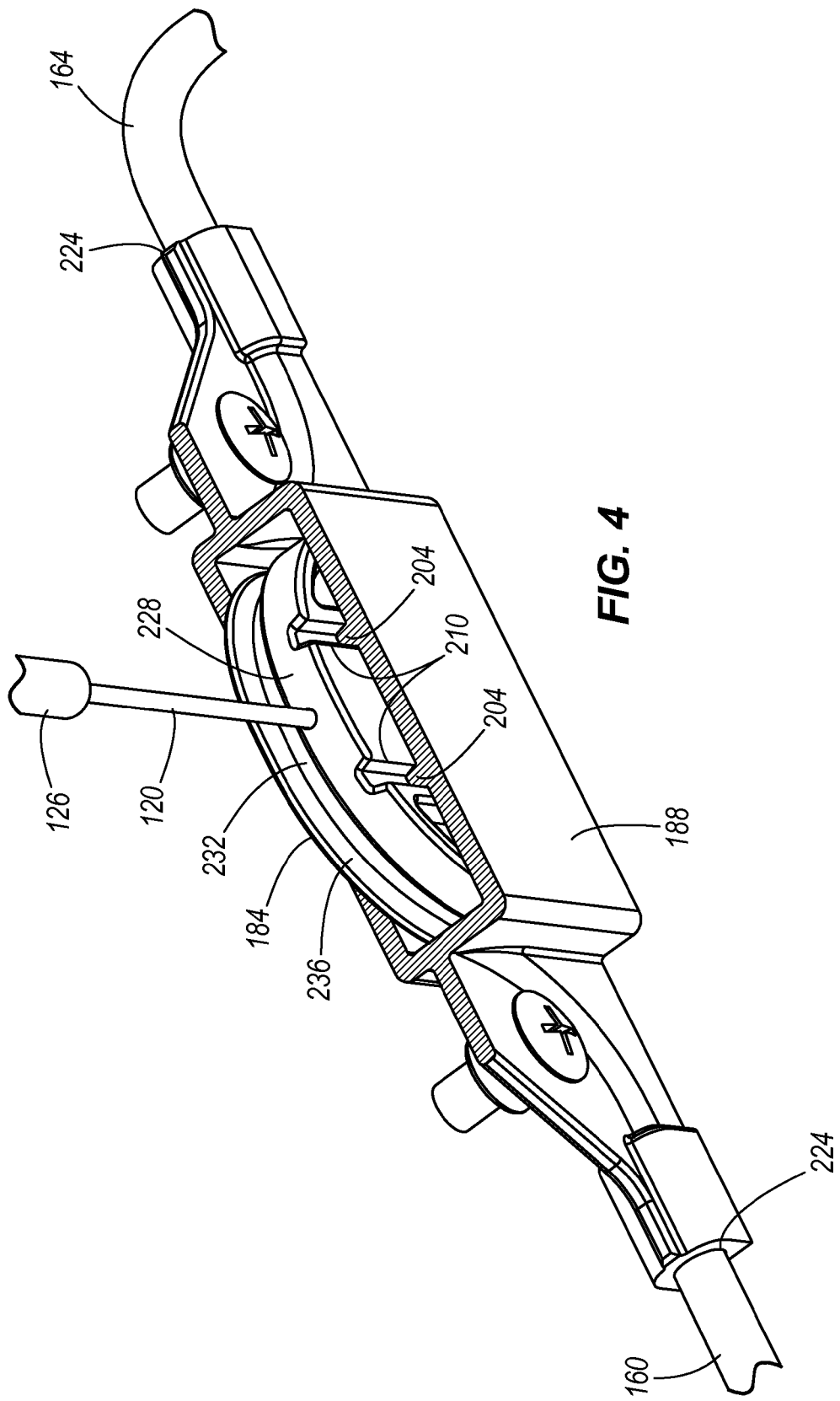
FIG. 4 is a partial perspective view of the synchronizer system of FIG. 1.

Referring to FIGS. 3 and 4, the sliding member 184 is generally arcuate in shape and configured to translate within the sliding member housing 188. To facilitate smooth movement, parallel depressions 210 are formed within a frontward face 212 of the sliding member 184 that cooperate with the rails 204 projecting into the interior region 196 of the sliding member housing 188, i.e., a tongue-and-groove type arrangement. As shown in FIG. 3, the sliding member 184 includes an aperture, or through-hole arrangement 216, through which the actuation cable 120 extends. The actuation cable 120 includes a stop 220 for retaining the position of the actuation cable 120 relative to the sliding member 184. The second end 172 of the first sheath 160 and the second end 172 of the second sheath 164 are affixed to the respective opposed openings 224 formed in the sliding member housing 188. The cable 148 passes into and out of the sliding member housing 188 through the opposed openings 224.

As shown in FIG. 4, the sliding member 184 presents an upper surface 228 oriented toward the motor 108 on which a medial portion 232 of the cable 148 is disposed. The upper surface 228 includes a contour, such as a groove or channel 236, to accommodate and at least partially surround the medial portion 232. The medial portion 232 of the cable 148 is cooperative with the upper surface 228 and is displaced during operation, as will be explained below.

Figure 5:
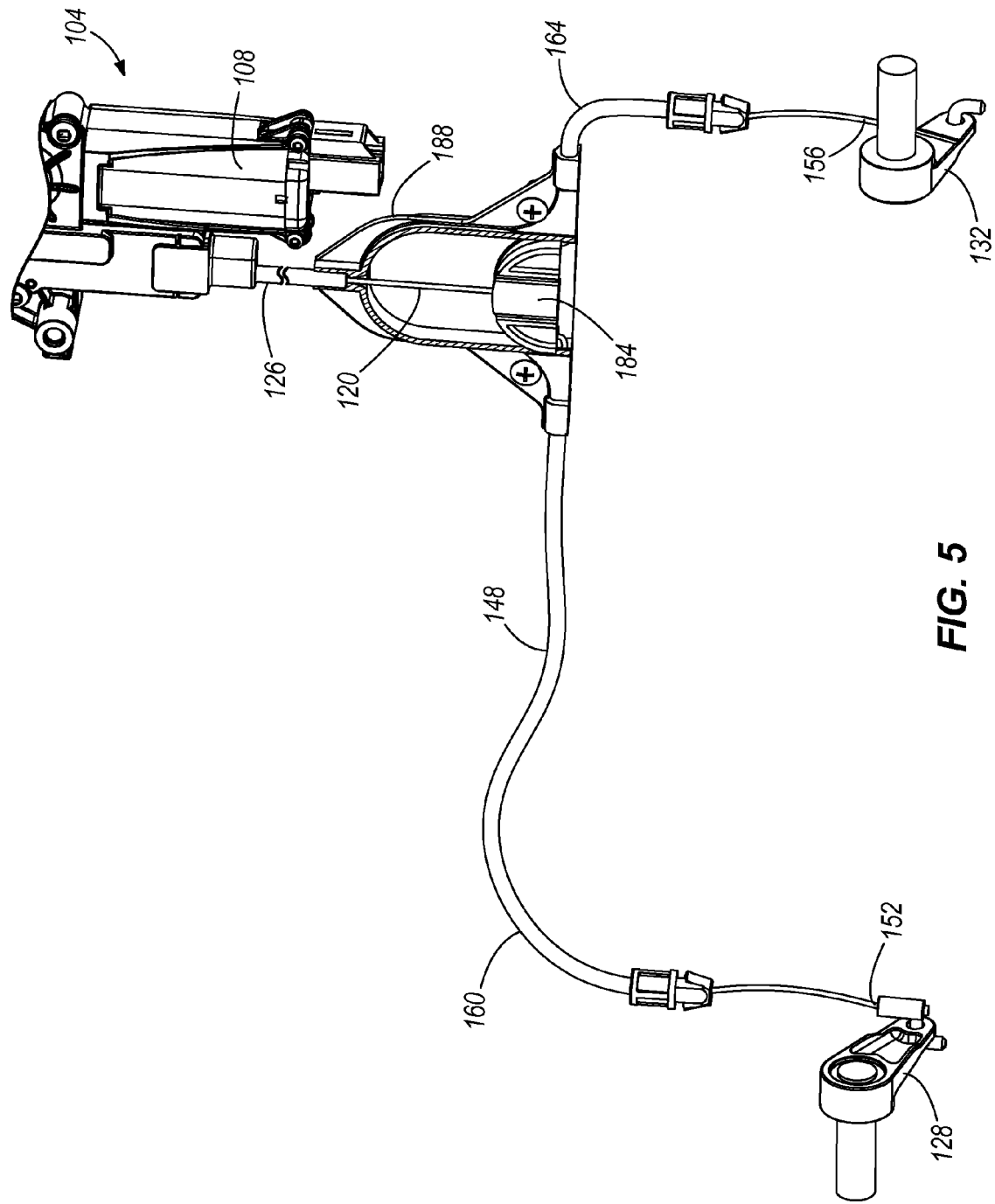
FIG. 5 is a perspective view of the synchronizer system of FIG. 1 in a first position.
Figure 6:
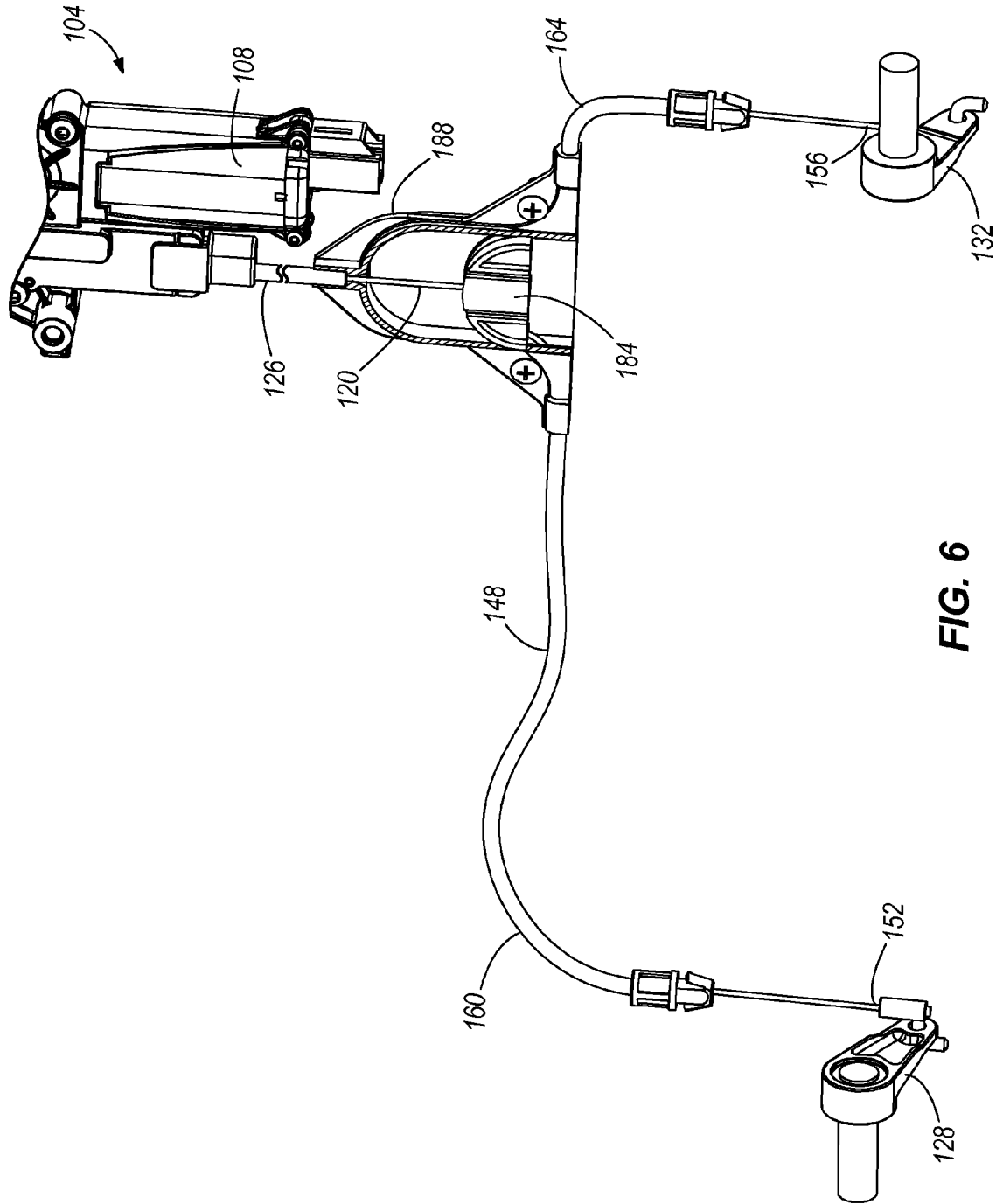
FIG. 6 is a perspective view of the synchronizer system of FIG. 1 in another position, different than the first position.

As shown in FIG. 5, when the latches 42, 46 (not shown) are in a locked position, for example, when the seat backrest 18 is upright, the cable 148 naturally includes a degree of flexibility or "slack," such that the cable 148 is not in uniform tension from the first end 152 to the second end 156. In operation, to unlock the latches 42, 46 in order to move the seat 10 from the upright position to the folded position, a user activates the motor 108 using an electrically actuated button or switch located in a user-accessible area of the seat (not shown). This energizes the motor 108, which engages the actuating cable 120. Referring to FIGS. 5-6, the motor 108 retracts the actuating cable 120, which advances the sliding member 184 linearly from a first position shown in FIG. 5, to a position shown in FIG. 6. In the position of FIG. 6, the sliding member 184 has translated within the sliding member housing 188 just far enough that the cable 148, being of a fixed length, uniformly increases in tension, i.e., any slack within the cable is "taken up," due to the interaction of the sliding member 184 and the cable 148. This results in an equal taut tension throughout the cable 148. The position of FIG. 6 represents the point at which the tension throughout the cable 148 is uniform but not of a magnitude sufficient to rotate the first and second levers 128, 132.

Figure 7:
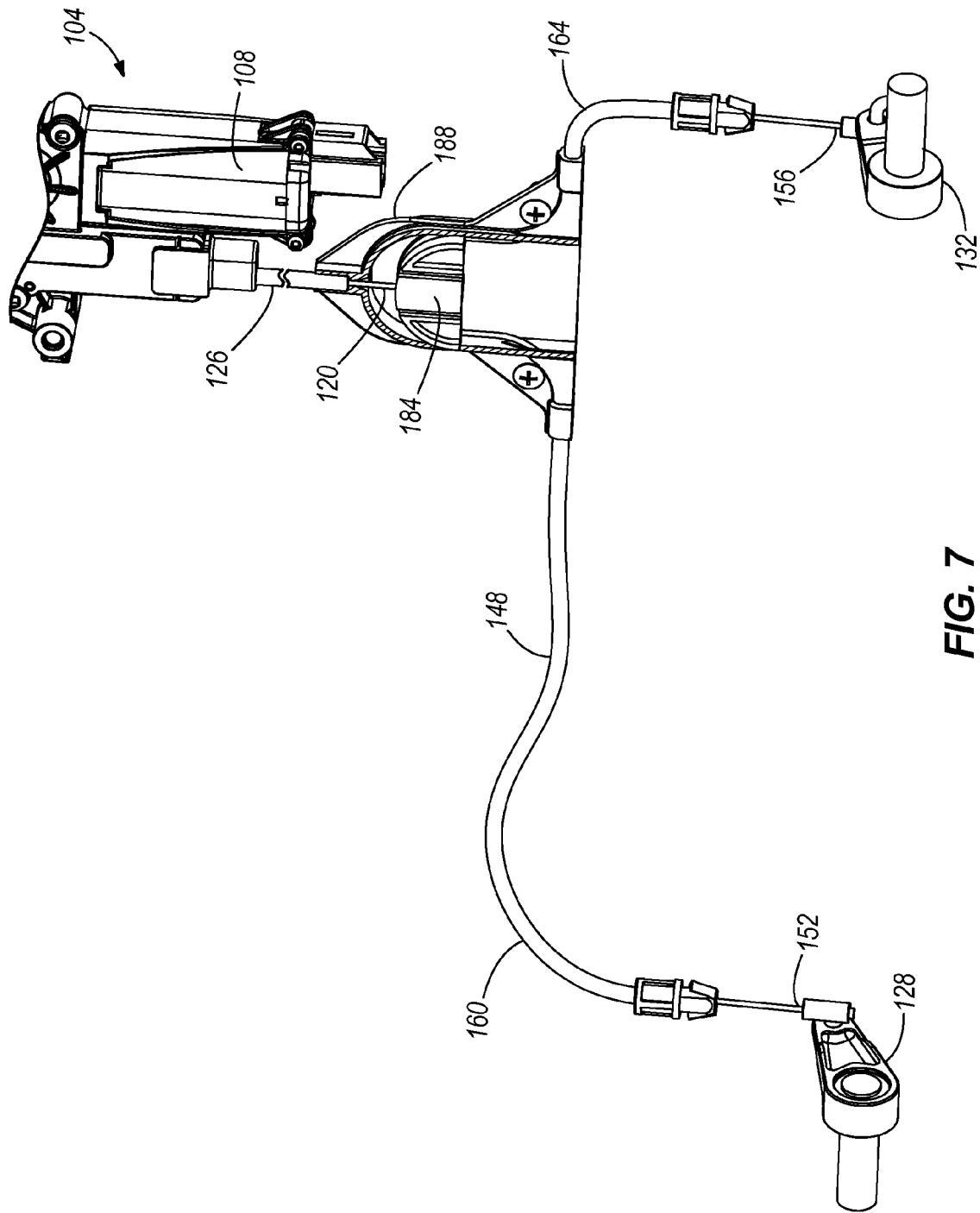
FIG. 7 is a perspective view of the synchronizer system of FIG. 1 in another position, different from the first position.

As the actuation cable 120 continues to retract, the medial portion 232 of the cable 148, disposed on the upper surface 228 of the sliding member 184, advances with the linear movement of the sliding member 184 from the position of FIG. 6 to the position of FIG. 7. The cable tension is consequently increased above a threshold necessary for rotation of the levers 128, 132, and both levers concurrently rotate about the pivot axis 50, simultaneously unlocking the latches 42, 46 and permitting the user to alter the position of the seat backrest 18. Though the above operation is described in three distinct positions, the transition from the position of FIG. 5 to the position of FIG. 7 is continuous.

Once the electric switch or button is no longer depressed and the motor 108 is deenergized, the sliding member 184 returns to the first position of FIG. 5, biased either by gravity or with the aid of a biasing spring (not shown). As the sliding member 184 moves from the position of FIG. 7 back to the first position, the tension in the cable 148 is relaxed, permitting the first and second latches 42, 46 to lock at the desired position of the seat backrest.

The sliding member 184 and the sliding member housing 188 are primarily formed from plastic, for example, a molded plastic, but other embodiments could be of any material suitable for the environment of use.

In an alternative arrangement, the motor housing 112, gearing arrangement, and gear housing 116 may be secured to the bottom support members 34, or to any fixed position within the seat 10.

The above-described synchronizer system 100, or actuation system, is not limited in its application to the adjustment of seats and is instead suitable for a number of applications for concurrently actuating a first mechanism and a second mechanism from a first state to a second state, examples of which include, but are not limited to, non-vehicular seats, beds, etc.

Various features and advantages of the invention are set forth in the following claims.

What is claimed is:

1. An actuation system for a folding seat, the seat including a seat frame having a first back support member, a second back support member, a first bottom support member, a second bottom support member, a first seat latch pivotally coupling the first back support member to the first bottom support member about a pivot axis, the first seat latch having a locked position and an unlocked position, and a second seat latch pivotally coupling the second back support member to the second bottom support member about the pivot axis, the second seat latch having a locked position and an unlocked position, the actuation system comprising:
an actuator configured for coupling to the seat frame;
a housing;
a sliding member coupled to the actuator and movable from a first position to a second position within the housing in response to actuation of the actuator; and
a connecting member having a first end configured for coupling to the first seat latch, a second end configured for coupling to the second seat latch, and a medial portion cooperative with the sliding member, wherein the connecting member extends without interruption through the sliding member and movement of the sliding member from the first position to the second position increases a path length of the connecting member within the housing and concurrently moves the first seat latch to the unlocked position and the second seat latch to the unlocked position.

2. The actuation system of claim 1, wherein the sliding member is movable to a third position between the first position and the second position, wherein the connecting member is taut with uniform tension at the third position.

3. The actuation system of claim 2, wherein the uniform tension is insufficient to unlock the first latch and the second latch.

4. The actuation system of claim 1, wherein the sliding member is coupled to the actuator by a flexible cable.

5. The actuation system of claim 1, wherein the sliding member includes a surface on which the medial portion of the connecting member is disposed.

6. The actuation system of claim 5, wherein the surface includes a contour at least partially surrounding the medial portion.

7. The actuation system of claim 1, further including a sliding member housing within which the sliding member moves from the first position to the second position.

8. The actuation system of claim 7, wherein the sliding member housing includes a rail, and wherein the sliding member includes a corresponding depression, wherein the rail and depression cooperate during movement from the first position to the second position.

9. The actuation system of claim 1, wherein the actuator is electrically actuated.

10. The actuation system of claim 1, wherein the connecting member is a flexible cable.

11. An actuation system for use with a folding seat, the seat including a seat frame having a first back support member, a second back support member, a first bottom support member, a second bottom support member, a first seat latch pivotally coupling the first back support member to the first bottom support member about a pivot axis, the first seat latch having a locked and unlocked position, and a second seat latch pivotally coupling the second back support member to the second bottom support member about the pivot axis, the second seat latch having a locked and unlocked position, the actuation system comprising:
a motor configured for coupling to the seat frame;
a single flexible cable having a first end configured for coupling to the first seat latch, a second end configured for coupling to the second seat latch, and a medial portion; and
a housing;
a sliding member coupled to the motor and configured to interact with the medial portion, the sliding member movable in the housing from a first position to a second position in response to actuation of the motor, wherein movement of the sliding member from the first position to the second position increases the cable length within the housing and concurrently moves the first seat latch to the unlocked position and the second seat latch to the unlocked position.

12. The actuation system of claim 11, wherein the sliding member is movable to a third position between the first position and the second position, wherein the connecting member is taut with uniform tension at the third position.

13. The actuation system of claim 12, wherein the uniform tension is insufficient to unlock the first latch and the second latch.

* * * * *